United States Patent [19]

Huggins

[11] Patent Number: 4,799,797
[45] Date of Patent: Jan. 24, 1989

[54] COHERENCE MULTIPLEXING OF OPTICAL SENSORS

[75] Inventor: Raymond W. Huggins, Mercer Island, Wash.

[73] Assignee: The Boeing Company, Seattle, Wash.

[21] Appl. No.: 121,467

[22] Filed: Nov. 17, 1987

[51] Int. Cl.$^4$ .................................................. G01B 9/02
[52] U.S. Cl. ..................................... 356/345; 250/227; 350/96.14
[58] Field of Search .......................... 356/345; 250/227; 350/96.11, 96.12, 96.13, 96.14

[56] References Cited

U.S. PATENT DOCUMENTS

| | | |
|---|---|---|
| 3,501,640 | 3/1970 | Harris . |
| 3,908,121 | 9/1975 | Riseberg et al. . |
| 4,236,243 | 11/1980 | Davis et al. . |
| 4,340,272 | 7/1982 | Papuchon et al. . |
| 4,505,587 | 3/1985 | Haus et al. . |
| 4,505,588 | 3/1985 | Ludman et al. . |
| 4,521,069 | 6/1985 | Ikeda . |
| 4,533,247 | 8/1985 | Epworth . |
| 4,571,024 | 2/1986 | Husbands . |
| 4,581,730 | 4/1986 | Ozeki et al. . |
| 4,583,817 | 4/1986 | Papuchon . |
| 4,592,043 | 5/1986 | Williams . |
| 4,755,668 | 7/1988 | Davis ................................. 250/227 |
| 4,759,627 | 7/1988 | Thylén et al. ....................... 356/345 |

OTHER PUBLICATIONS

J. L. Brooks et al., "Coherence Multiplexing of Fiber-Optic Interferometric Sensors," *Journal of Lightwave Technology*, vol. LT-3, No. 5, Oct. 1985, pp. 1062–1072.
A. Dandridge et al., "Phase Noise of Single-Mode Diode Lasers in Interferometer Systems," *Appl. Phys. Lett.* 39(7), Oct. 1, 1981, pp. 530–532.
K. Peterman et al., "Semiconductor Laser Noise in an Interferometer System," *IEEE Journal of Quantum Electronics*, vol. QE-17, No. 7, Jul. 1981, pp. 1251–1256.
C. S. Wang et al., "High-Power Low-Divergence Superradiance Diode," *Appl. Phys. Lett.* 41(7), Oct. 1, 1982, pp. 587–589.
R. H. Wentworth et al., "Expected Noise Levels For Interferometric Sensors Multiplexed Using Partially Coherent Light," Proceedings of Society of Photo-Optical Instrumentation Engineers, vol. 566, Fiber Optic and Laser Sensors III (1985), pp. 212–217.

*Primary Examiner*—Edward P. Westin
*Assistant Examiner*—Matthew W. Koren
*Attorney, Agent, or Firm*—Christensen, O'Connor, Johnson & Kindness

[57] ABSTRACT

A multiplexed optical sensor system comprising a short coherence length source (SLD 60), a plurality of waveguide sensors (62, 64), a corresponding plurality of waveguide detectors (68, 70), and a common optical bus 84. Each sensor comprises a sensor interferometer having sensing and reference arms, each arm comprising an optical waveguide. Means are provided for varying the optical path length of the sensing arm based on a sensed input parameter. In one preferred embodiment, the detection subsystem comprises a plurality of detectors, each comprising a photodetector and a detector interferometer having first and second arms. The arms of each sensor interferometer (i) have an optical path length difference LS(i) that is greater than the coherence length of the SLD, and that differs from the path length difference LS(j) of each other sensor interferometer by an amount greater than the coherence length of the SLD. Each detector has a path length difference LD(i) that differs from the path length difference of an associated sensor LS(i) by not substantially more than the coherence length of the SLD. Thus variation of each sensed input parameter produces an amplitude variation in the output of a corresponding detector. An embodiment comprising a single swept detector interferometer is also disclosed.

10 Claims, 5 Drawing Sheets

COHERENCE MULTIPLEXING OF OPTICAL SENSORS

FIELD OF THE INVENTION

The present invention relates to optical sensors and, in particular, to an improved technique for coherence multiplexing such sensors onto a single optical bus.

BACKGROUND OF THE INVENTION

One of the problems encountered in implementing optical sensors is that no satisfactory scheme has been yet devised for multiplexing passive optical sensors onto a single fiber-optic bus. The techniques that have been proposed and tried to date include an optical time domain reflectometer bus, and wavelength division multiplexing. In the optical time domain reflectometer bus, the source is pulsed, and each sensor responds to the pulse. Because the sensors are separated spatially along the bus, the responses will be received by the detector as a time multiplexed data stream. A problem associated with this method of multiplexing is that it is difficult to fabricate suitable sensors.

In the wavelength division multiplexing approach, the wavelength of the source is ramped, the source is broadband in nature, or the outputs of a number of sources of different wavelengths are combined, and each sensor responds to a specific wavelength. The problem with this technique is that it is difficult to find suitable broadband sources, or a source that can be ramped over an adequate wavelength range. A further problem is that the available choices of sensors that respond at different wavelengths is quite limited.

A technique termed coherence multiplexing has recently been devised for multiplexing optical signals onto a single bus. This technique may be explained with reference to FIG. 1, which illustrates a prior art single sensor (nonmultiplexed) system comprising laser diode 12, sensor 14 and detector 16. Sensor 14 consists of a Mach-Zehnder interferometer comprising couplers 20 and 22 and fiber-optic cables 24 and 26 that comprise the two arms of the interferometer. Electromagnetic radiation from laser diode 12 is coupled through fiber-optic cable 30 to coupler 20, and coupler 20 divides the radiation between fiber-optic cables 24 and 26. Radiation exiting from the opposite ends of the fiber-optic cables is combined by coupler 22 onto output fiber-optic cable 32.

Sensor 14 includes means for modulating the optical path length of one of arms 24 or 26, for example arm 26, in accordance with a sensed input parameter. Known fiber-optic sensors of this type include electric and magnetic field sensors, hydrophones, and temperature sensors. However for the system of FIG. 1, the optical path length difference between arms 24 and 26 is selected such that for all expected values of the sensed parameter, the path length difference between the arms is greater than the coherence length of laser diode 12. As a result, a change in the relative phase between the arms of the interferometer will not be converted into a detectable intensity modulation at the interferometer output on fiber-optic cable 32. Nevertheless, the phase information generated by sensor 14 will be retained.

Figure 1:
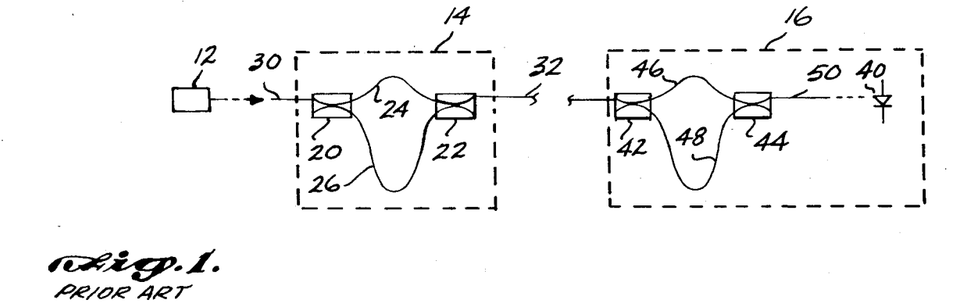
FIG. 1 is a diagram showing a prior art sensor system based on fiber optic interferometers.

Detector 16 comprises photodetector 40, and a Mach-Zehnder interferometer comprising couplers 42 and 44 and fiber-optic cable arms 46 and 48. The signal provided by sensor 14 on fiber-optic cable 32 is input to coupler 42, and split by the coupler between arms 46 and 48. The signals exiting from the opposite ends of the arms are combined by coupler 44 and conveyed by fiber-optic cable 50 to photodetector 40. Detector 16 is designed such that the optical path length difference bertween arms 46 and 48 differs from the optical path length difference between arms 24 and 26 by an amount less than the coherence length of laser diode 12, for all expected values of the sensed parameter. As a result, the difference in optical path length between a composite sensing path comprising arms 26 and 46, and a composite reference path comprising arms 24 and 48, is made less than the coherence length of source 12 for all expected values of the sensed parameter. Thus when the radiation that has traveled through the composite sensing and reference paths is combined by coupler 44 onto fiber-optic cable 50, interference will be produced. Therefore, as the optical path length of arm 26 is modified by the sensed input parameter, a detectable modulation of the signal on fiber-optic cable 50 will be detected by photodetector 40.

Figure 2:
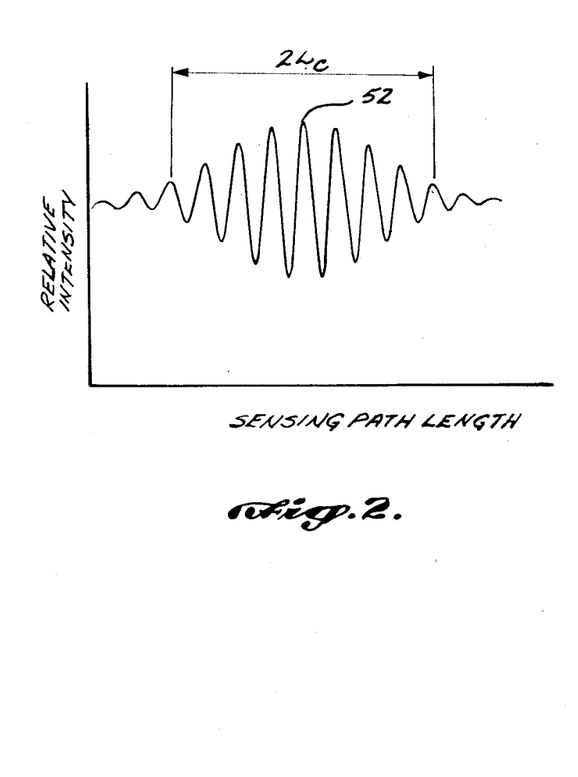
FIG. 2 is a graph showing a typical interference pattern.

A typical output produced by detector 16 is illustrated in FIG. 2, which shows the relative intensity of the radiation propagating along fiber-optic cable 50 as the optical path length of arm 26 is varied by variation of the sensed parameter. The intensity includes a steady, DC level that results from radiation that has passed through composite paths comprising arms 24–46 and 26–48, and a superimposed interference pattern resulting from radiation that has passed through the composite sensing path and the composite reference path. At point 52, the composite sensing and reference path lengths are equal, and the radiation that has traversed such paths interferes constructively to produce a maximum in the output intensity. As the path length of arm 26 varies in either direction from point 52, fringes of diminishing intensity are produced. As the difference between the composite sensing and reference paths approaches and exceeds the coherence length of source 12, the fringe amplitude decreases to zero, and no amplitude variations are produced.

The extension of the above-described concepts to a multiplexed multisensor system has been proposed. In such a system, each sensor/detector pair would have a path length difference that was larger than the coherence length of the source laser diode, and that was also different from the path length differences of the other sensor/detector pairs by an amount greater than the coherence length of the source. As a result, each detector output would be modulated only by path length changes introduced by its corresponding sensor. However, the difficulty with such a multiplexing technique is that it is difficult to find illumination sources having appropriate coherence lengths. The coherence length of a laser diode is of the order of meters. Thus in a laser diode system, the fiber-optic cable arms of each interferometer must have a path length difference on the order of ten or more meters, and its associated detector must have a similar path length difference. It would be extremely cumbersome to implement a multisensor system having fiber-optic cables of such lengths. The use of optical sources having much shorter coherence lengths has also been proposed. For example, an LED or superluminescent diode (SLD) has a coherence length on the order of 15 microns. There are advantages in using a source having a short coherence, such as reduced phase noise. However, a severe practical problem in using an SLD source would be that of controlling the path lengths of fiber-optic cables to accuracies on the order of tens of microns.

SUMMARY OF THE INVENTION

The present invention provides a practical technique for the coherence multiplexing of optical signals from a plurality of optical sensors onto a common optical bus. In a preferred aspect, the invention makes use of superluminescent diode to provide a source having a short coherence length, and wavelength interferometers for producing small, accurate and controllable path length differences.

In a preferred embodiment, the optical sensor system of the present invention comprises a common optical bus, one or more optical sources, each having a short coherence length, a plurality of sensors, and a detection subsystem. Each sensor comprises a sensor interferometer formed on a suitable substrate. The sensor interferometer comprises a sensing arm and a reference arm, each arm comprising an optical waveguide having first and second ends. The sensor interferometer further comprises means for coupling radiation from an associated one of the sources into the first ends of the arms, and means for coupling sensor modulated radiation from the second ends of the arms into the optical bus. The arms of each sensor interferometer (i) have an optical path length difference LS(i) that is greater than the coherence length of the associated source. The optical path length difference LS(i) also differs from the path length difference LS(j) of each sensor by an amount greater than the coherence length of the source associated with path length difference LS(i). Each sensor includes means for varying the optical path length of its sensing arm based on a sensed input parameter.

The detection subsystem is coupled to receive the sensor modulated radiation from the optical bus. The detector subsystem comprises detector interferometer means for causing separate portions of the sensor modulated radiation, for each path length difference LS(i), to travel along first and second optical paths that have a path length difference LD(i) that differs from LS(i) by an amount not substantially greater than the coherence length of the source associated with LS(i). The detector interferometer means also includes means for combining the sensor modulated radiation that has traveled along the first and second optical paths, to produce an optical output signal having an intensity that varies as the sensed parameter of the associated sensor varies.

In one preferred embodiment, the detection subsystem comprises a plurality of detectors, each detector comprising a detector interferometer formed on a substrate. Each detector preferably includes a photodetector for converting the optical output signal into a corresponding electrical output signal. The detector interferometers and photodetectors may be fabricated on a common substrate. In a second preferred embodiment, the detection subsystem comprises a detector interferometer having first and second detector arms. The detector interferometer is formed in an electro-optic substrate, and sweep means are provided for varying the optical path length of the first detector arm. The sweep means causes the path length difference between the first and second detector arms to sweep through a range of path length differences, such that each path length difference LS(i) differs from a path length difference in the range by an amount no greater than the coherence length of the optical source associated with path length difference LS(i). For all embodiments, a single optical source may be provided, and the sensors may be serially coupled along the optical bus such that radiation from the optical source passes from the first to the second end of each arm of each sensor interferometer.

DETAILED DESCRIPTION OF THE INVENTION

Figure 3:
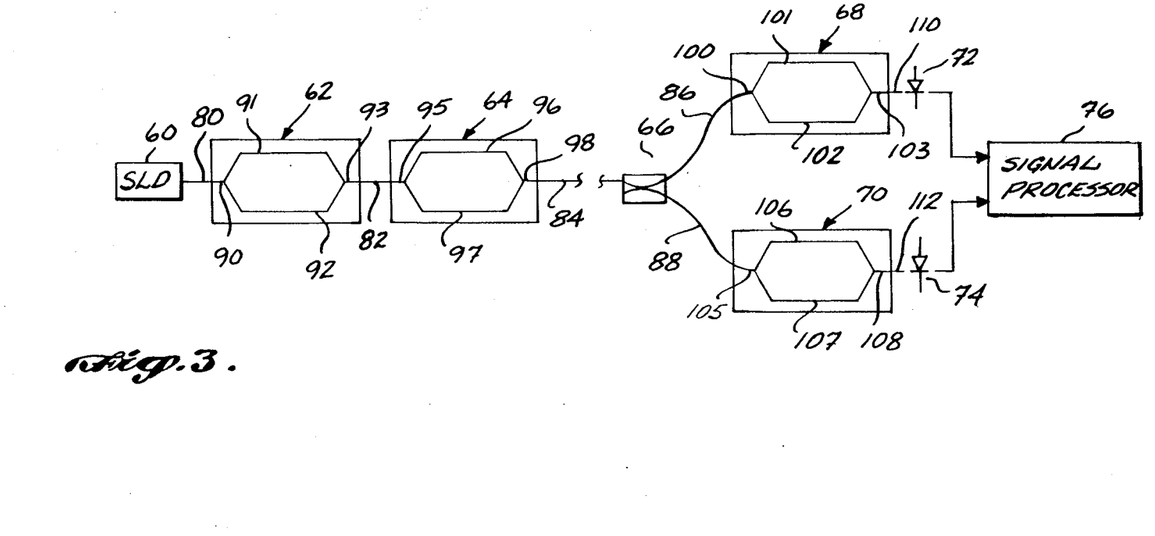
FIG. 3 is a diagram of one preferred embodiment of the sensor system of the present invention.

One preferred embodiment of the sensor system of the present invention is illustrated in FIG. 3. This system includes superluminescent diode (SLD) 60, sensors 62 and 64, and a detection subsystem comprising coupler 66, detectors 68 and 70, photodiodes 72 and 74, and signal processor 76. SLD 60 and sensors 62 and 64 are serially connected along an optical bus comprising single mode fiber-optic cables 80, 82 and 84. Detectors 68 and 70 are coupled to the optical bus via coupler 66 and respective single mode fiber-optic cables 86 and 88.

Although only two sensors and two detectors are shown in the embodiment of FIG. 3, the extension to any arbitrary number N of sensors and detectors is straightforward. In an N sensor system analogous to the system shown in FIG. 3, the N sensors would be serially connected along the common optical bus, and the N detectors would be coupled in parallel to the bus through a tree-like arrangement of couplers. For example in a four detector embodiment, the radiation on each of fiber-optic cables 86 and 88 would be input to a coupler, with the four outputs going to the four detectors. Other arrangements of the sensors are also possible. For example, the sensors could be connected in parallel to bus 84, with each sensor having its own optical source, or with all sensors receiving radiation from a single optical source.

In the preferred embodiment shown in FIG. 3, each sensor and detector comprises a Mach-Zehnder interferometer fabricated as an optical waveguide structure on a suitable substrate such as glass, silicon, lithium niobate or gallium arsenide. The advantage of using waveguides for the sensor and detector interferometers is that small, accurate and reproducible path length differences can readily be produced. Sensor 62 comprises input waveguide 90, reference arm (waveguide) 91, sensing arm (waveguide) 92, and output waveguide 93. Radiation entering input waveguide 90 from fiber-optic cable 80 is split between reference arm 91 and sensing arm 92, and the radiation passing through the reference and sensing arms is combined onto output waveguide 93 that is coupled to fiber-optic cable 82. Means are provided for varying the optical path length of sensing arm 92 in accordance with a first sensed parameter. In a similar manner, sensor 64 comprises input wavelength 95, reference arm (waveguide) 96, sensing arm (waveguide) 97 and output waveguide 98. Means are provided for varying the optical path length of sensing arm 97 in accordance with a second sensed parameter. Suitable waveguide sensors are described further in commonly assigned U.S. patent application Ser. No. 121,466, filed concurrently herewith, inventors R. A. Falk and R. W. Huggins, entitled Integrated Optic Field Sensor, hereby incorporated by reference.

The path length difference between reference arm 91 and sensing arm 92 of sensor 62 is designated by LS(1), and the analogous path length difference for sensor 64 is designated by LS(2). The path length differences LS(1) and LS(2) are each chosen such that for all expected values of the respective sensed parameters, the path length differences LS(1) and LS(2) are greater than the coherence length $L_c$ of SLD 60, and are different from one another by an amount greater than coherence length $L_c$. Preferably, each path length difference LS(i) is substantially greater than $L_c$, and all are different from one another by an amount substantially greater than $L_c$. For example, in a system in which $L_c$ was 15 microns, the path length differences of sensors 62 and 64 could be 500 microns and 700 microns, respectively. Additional sensors in such a system could be added, with path length differences of 800 microns, 850 microns, etc., where these values have been chosen to avoid undesired path length differences which are less than the coherence length. Each of sensors 62 and 64 phase modulates the input optical signal on fiber-optic cable 80, to produce a composite sensor modulated signal on fiber-optic cable 84 that contains phase information modulated by the parameters sensed by both sensors.

For a system in which the sensors were connected in parallel between SLD 60 and fiber optic cable 84, the considerations set forth above for the sensor path length differences would be unchanged. For a system in which each sensor included its own SLD radiation source, then the path length difference of each sensor would be chosen such that it was greater than the coherence length of its associated SLD source, and such that it differed from the path length difference of each other sensor by an amount greater than the coherence length of its associated source.

Detector 68 comprises a waveguide interferometer including input waveguide 100, first arm (wavelength) 101, second arm (waveguide) 102, and output waveguide 103. Detector 70 comprises a waveguide interferometer including input waveguide 105, first arm (waveguide) 106, second arm (waveguide) 107, and output waveguide 108. The optical path length difference LD(1) between arms 101 and 102 is selected to be substantially equal to the optical path length difference LS(1) of sensor 62. In particular, the optical path length differences LS(1) and LD(1) differ from one another by an amount not substantially greater than the coherence length $L_c$ of SLD 60. Similarly, the optical path length difference LD(2) between arms 106 and 107 is selected to be substantially equal to the optical path length difference LS(2) of sensor 64, such that LS(2) and LD(2) differ by no more than coherence length $L_c$. As a result, the intensity of the optical signal produced by detector 68 on fiber-optic cable 110 will exhibit amplitude variations due to interference between radiation that has passed through the shorter arm of sensor 62 and the longer arm of detector 68, and radiation that has passed through the longer arm of sensor 62 and the shorter arm of detector 68. Thus phase modulation produced by sensor 62 in response to variations of the first sensed parameter will appear as an amplitude modulation of the optical signal on fiber-optic cable 110. In a similar manner, phase modulation produced by sensor 64 in response to variations of the second sensed parameter will appear as amplitude modulation of the optical signal on fiber-optic cable 112.

The optical signals on fiber-optic cables 110 and 112 are preferably converted into electrical signals by photodiodes 72 and 74 respectively, and the corresponding electrical signals are then processed by any suitable signal processor 76. For comparatively coarse measurements, the signal processor could simply count fringes as each sensed parameter varied. In a more accurate system, the signal processor would determine both the number of whole fringe variations as well as the fractional fringe variation, to provide higher resolution. In general, fringe counting techniques are well known in the art, and do not per se form a part of the present invention.

Figure 4:
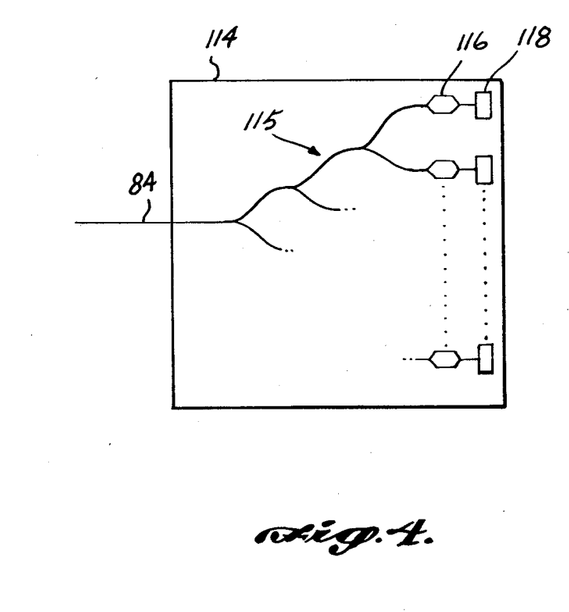
FIG. 4 is a diagram of a preferred embodiment of the detector subsystem.

In the system shown in FIG. 3, each sensor/detector pair is preferably fabricated from the same mask, thereby producing interferometers having extremely closely matched path length differences. Detectors 68 and 70 could also be fabricated such that the photodiodes were loated directly on the waveguide substrate. Further, the entire detection system could be fabricated on a single substrate, as shown in FIG. 4. The embodiment shown in FIG. 4 includes substrate 114 on which a plurality of waveguide interferometers 116 and photodetectors 118 have been fabricated. The interferometers are coupled to fiber-optic cable 84 by a tree-like waveguide/coupler structure 115. This integration produces compactness along with considerable cost savings.

Because of the short coherence length of the SLD source, the number of fringes produced by each detector will be comparatively small, and will be approximately equal to twice the coherence length of the SLD divided by the radiation wavelength. Therefore for a SLD emitting at 820 nanometers, and having a coherence length of about 20 microns, the interference pattern will contain about 25 fringes and will have an amplitude envelope similiar to that shown in FIG. 2. Thus fringe counting will only be possible if the path length changes in the sensing arm of the sensing interferometer are limited to only a few wavelengths. If this is not the case, the change will fall outside the interference window, and the fringe pattern will be lost.

Figure 5:
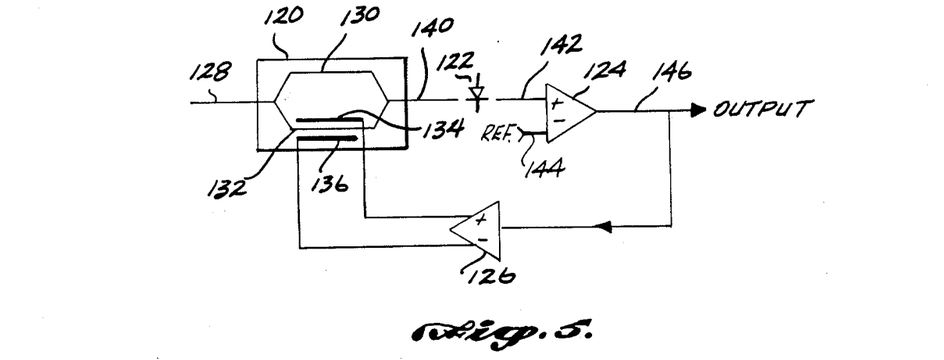
FIG. 5 is a diagram showing a preferred embodiment of one detector.

One method of overcoming this problem is to electronically change the optical path length of one of the arms of each detector interferometer, so that its optical path length tracks that of the sensing arm in the associated sensing interferometer. The optical path length change in the detection interferometer arm can be effected by using an electro-optic substrate, and placing two electrodes adjacent to one arm. Such an embodiment is shown in FIG. 5, wherein the illustrated detector includes waveguide interferometer 120, photodiode 122, differential amplifier 124, and differential driver 126. Interferometer 120 receives a portion of the sensor modulated radiation via fiber-optic cable 128, and divides such radiation between first arm (waveguide) 130 and second arm (waveguide) 132. The sensor modulated radiation that travels through arms 130 and 132 is recombined and output onto fiber-optic cable 140. Electrodes 134 and 136 are fabricated directly on the substrate of interferometer 120 adjacent to arm 132, and are connected to the outputs of differential driver 126.

In operation, the optical signal fiber optic cable 140 is converted into a corresponding electrical signal on line 142 by photodiode 122, the electrical signal on line 142 is connected to one input of differential amplifier 124. The other input of the differential amplifier, on line 144, is connected to a suitable reference level, and the differential amplifier therefore produces an output signal on line 146 that is proportional to the difference between the photodiode signal and the reference level. The output signal on line 146 forms the input of differential driver 126, and the differential driver provides a differential voltage on electrodes 134 and 136 that is proportional to the output signal on line 146.

Figure 6:
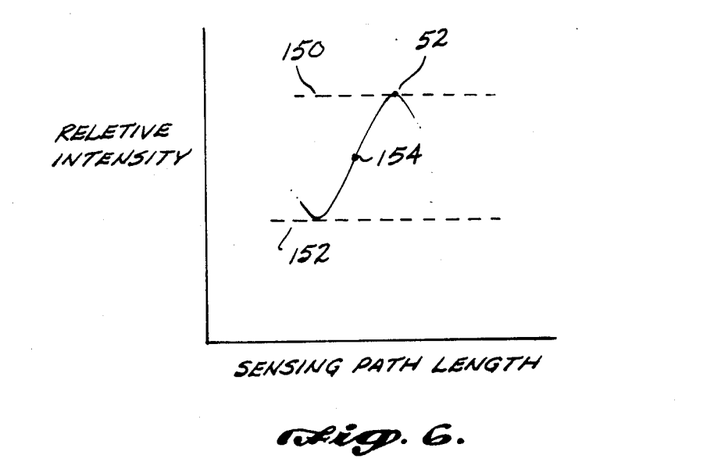
FIG. 6 is a graph showing a portion of an interference pattern.

FIG. 6 represents the central portion of the fringe pattern shown in FIG. 2, at which point the intensity varies between maximum level 150 and minimum level 152 is indicated. The reference level on line 144 is selected such that the detection subsystem operates at quadrature point 154, midway between the maximum and minimum levels. Quadrature point 154 is a point of maximum sensitivity, because at the quadrature point, a given sensing path length change will produce the maximum amplitude variation. Methods for operating interferometers at such quadrature points are known to those skilled in the art. At quadrature point 154, the voltage on electrodes 134 and 136 is set such that the detector's optical path length difference LD(i) differs by exactly 90° of phase from the optical path length difference LS(i) of the associated sensor. As the parameter sensed by the associated sensor varies, a corresponding amplitude variation occurs in the optical signal on line 140. This produces corresponding variations of the electrical signals on lines 142 and 146. As a result, differential driver 126 changes the voltage on electrodes 134 and 136 so that the path length difference of the detector tracks that of the sensor. Thus the output signal on line 146 tracks (and provides a measure of) variation of the sensed parameter. The path length change in the sensing arm of the sensing interferometer is limited only by the path length changes that can be produced in arm 132 by suitable voltages on electrodes 134 and 136.

Figure 7:
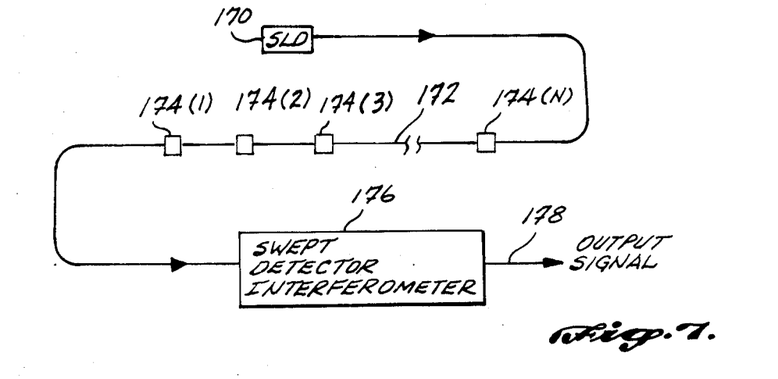
FIG. 7 is a diagram showing an embodiment that uses a swept detector intereferometer.
Figure 8:
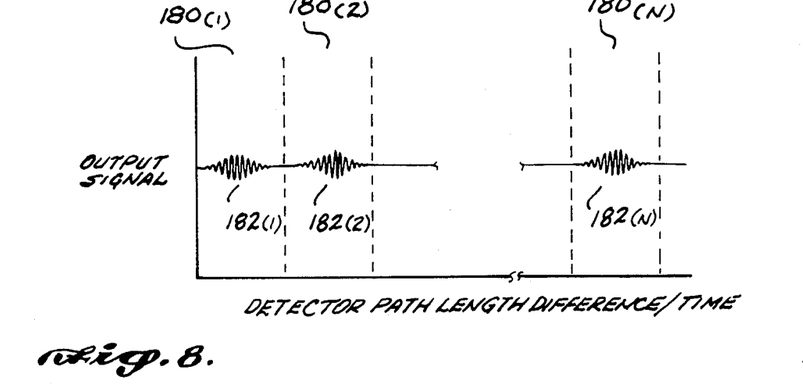
FIG. 8 is a graph showing an output signal of the system of FIG. 7.

A limitation of the systems shown in FIGS. 3–6 is that the sensor modulated radiation is divided by N, where N is the number of detectors. An alternative approach that does not involve dividing the sensor modulated radiation by N is shown in FIG. 7. The system of FIG. 7 includes superluminescent diode (SLD) 170, single mode fiber-optic bus 172, a plurality of N sensors 174(1) through 174(N) connected serially along bus 172, and swept detector interferometer 176 that is coupled to bus 174, and that produces an electrical output signal on line 178. Each sensor comprises a waveguide interferometer, such as the ones shown in the embodiment of FIG. 3. The path length difference of detector interferometer 176 is swept (e.g., varied) with time, over a range of path length differences that includes the path length difference of each sensor. As a result, the output signal on line 178 has the general form shown in FIG. 8, which illustrates the output signal intensity variations with variation of the path length difference of the detector interferometer. In slot 180(1), the path length difference of the detector interferometer sweeps through a range that includes the path length difference of sensor 174(1). As a result, an intereference pattern 182(1) is detected during that portion of the sweep in which the sensor and detector path length differences are within about $L_c$ of one another, where $L_c$ is the coherence length of SLD 170. The output signal then drops down its background value until the detector path length difference reaches slot 180(2), at which point a second interference pattern 182(2) is produced when the path length difference of the detector matches that of waveguide sensor 174(2). Thus by sweeping the detector path length difference over a suitable range, the parameters sensed by the sensors can be sequentially measured. In particular, the position of each interference pattern 182(i) in each slot 180(i) corresponds to the path length difference of the sensor that has a path length difference corresponding to that slot.

Figure 9:
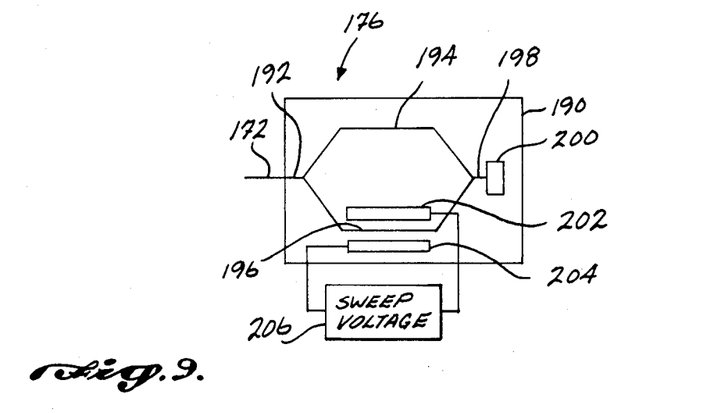
FIG. 9 is a diagram of a first preferred embodiment of a swept detector.
Figure 10:
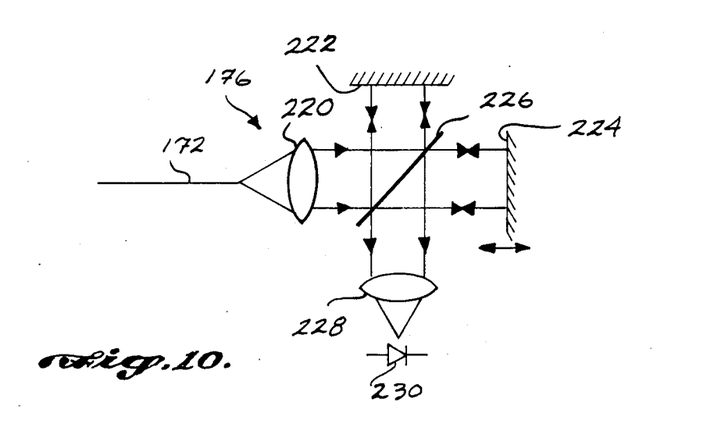
FIG. 10 is a diagram of a second preferred embodiment of a swept detector.

Two suitable implementations of swept detector interferometer 176 are illustrated in FIGS. 9 and 10. In FIG. 9, the detector interferometer is fabricated on an electro-optic (e.g., lithium niobate) substrate 190, and comprises input waveguide 192, waveguide arms 194 and 196, output waveguide 198 and photodetector 200. Positioned along arm 196 are a pair of surface electrodes 202 and 204 that are coupled to a suitable sweep generator 206. The voltage ramp applied to the surface electrodes ramps the refractive index of a portion of arm 196, and thereby causes the detector to sweep through the required range of path length differences.

A second suitable embodiment for a swept detector interferometer is exemplified by the Michelson interferometer shown in FIG. 10. The Michelson interferometer includes collimating lens 220, fixed mirror 222, movable mirror 224, beam splitter 226, focusing lens 228 and photodetector 230. The sensor modulated radiation from bus 172 is expanded and collimated by collimating lens 220 and split by the beam splitter into a first beam that strikes fixed mirror 222 and a second beam that strikes movable mirror 224. The beam splitter then recombines the reflected beams onto focusing lens 228 and thence to photodetector 230. Thus the first "arm" of this interferometer is the round-trip path from the beam splitter to mirror 222, and the second "arm" is the roundtrip path from the beam splitter to mirror 224. By moving mirror 224 through a suitable range (e.g., either electromechanically or piezoelectrically), a suitable sweep is obtained. Since the light gathering power of the interferometer is not of paramount importance for this application, the aperture of the instrument can be small, leading to a compact and rugged device.

Figure 11A:
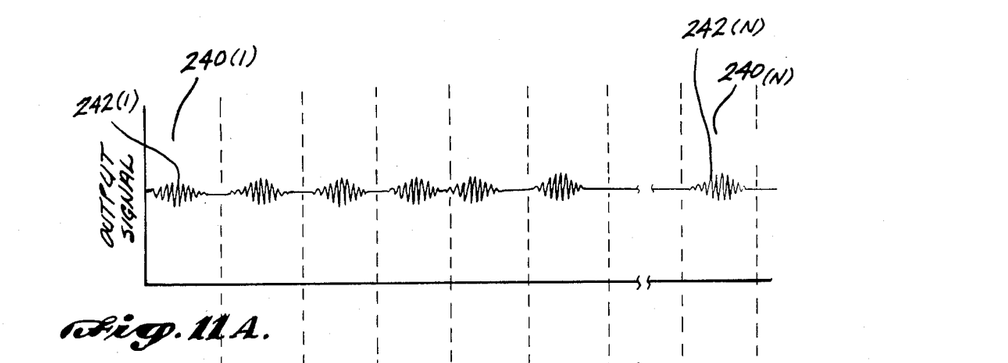
FIGS. 11A, 11B and 11C are graphs showing the output from a swept detector interferometer.
Figure 11B:
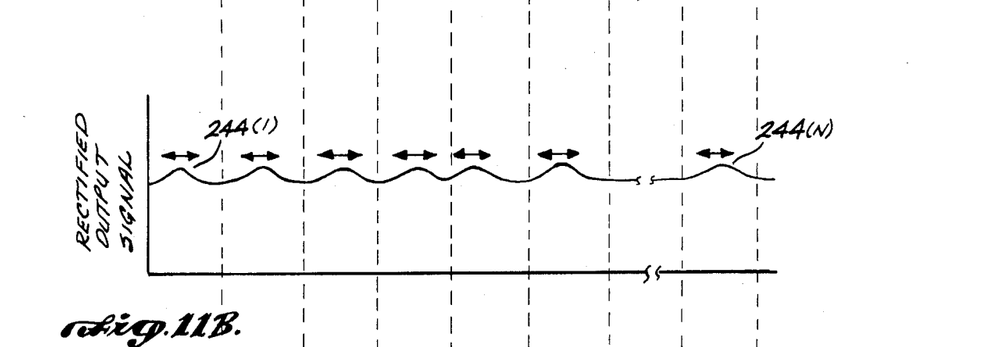
Figure 11C:
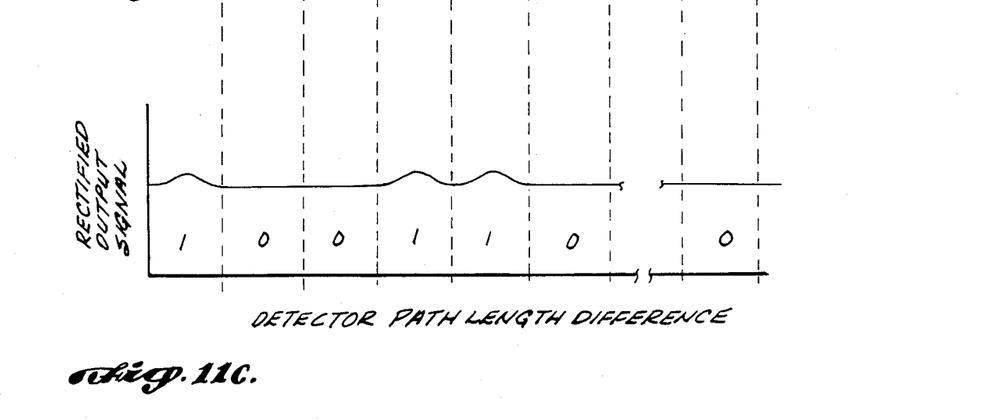

Signal processing for swept detector interferometer 176 is illustrated in FIGS. 11A–11C. FIG. 11A shows the output signal on line 178 as a function of the detector path length. As in FIG. 8, the output signal shows a series of interference patterns 242(1) through 242(N) in a series of slots 240(1) through 240(N). If the path change of the sensing arm of the sensing interferometer is only a fraction of a wavelength, computer signal processing will be required to determine the fringe shift of each interference pattern. If, however, the path length change is many wavelengths, the shift in the fringe envelope can be detected. This can be accomplished by rectifying and then integrating the detector output signal shown in FIG. 11A to produce the signal shown in FIG. 11B, wherein each interference pattern has been replaced by an envelope 244(1) through 244(N). The position of each envelope 244 in each slot is a measure of the path length difference introduced into the sensing arm of the corresponding sensing interferometer.

Alternatively, if the optical path through the sensing arm of a sensor is broken, the resonance pattern will be absent, as shown in certain of the slots in FIG. 11C. This method of signal processing will find application in binary resolvers with multiple tracks where, for example, a 1 bit will cause the sensing arm optical path to be present, and a 0 bit will break the sensing arm optical path. The resolver will then be read detecting the absence of presence of each interference pattern.

While the preferred embodiments of the invention has been illustrated and described, variations will be apparent to those skilled in the art. Accordingly, the invention is not to be limited to these specific embodiments, and the scope of the invention is rather to be determined by reference to the following claims.

The embodiments of the invention in which an exclusive property or privilege is claimed are defined as follows:

1. An optical sensor system, comprising:
a common optical bus;
one or more optical sources, each source having a coherence length;
a plurality of sensors, each sensor comprising a sensor interferometer formed in substrate, the sensor interferometer comprising a sensing arm and a reference arm, each arm comprising an optical waveguide having first and second ends, the sensor interferometer further comprising means for coupling radiation from an associated one of the sources into the first ends of the arms and means for coupling sensor modulated radiation from the second ends of the arms into the optical bus, the arms of each sensor interferometer (i) having an optical path length difference LS(i) that is greater than the coherence length of the associated source and that differs from the path length difference LS(j) of the sensor interferometer of each other sensor by an amount greater than the coherence length of the source associated with path length difference LS(i), each sensor further comprising means for varying the optical path length of the sensing arm based on a sensed input parameter; and
a detection subsystem coupled to receive the sensor modulated radiation from the optical bus, the detector subsystem comprising detector interferometer means for causing separate portions of the sensor modulated radiation, for each path length difference LS(i), to travel along first and second optical paths that have a path length difference LD(i) that differs from LS(i) by an amount not substantially greater than the coherence length of the source associated with path length difference LS(i), and for combining the sensor modulated radiation that has traveled along the first and second optical paths to produce an optical output signal having an intensity that varies as the sensed parameter of the associated sensor varies.

2. The sensor system of claim 1, wherein the detection subsystem comprises a plurality of detectors coupled to receive the sensor modulated radiation from the optical bus, each detector being associated with one of the sensors, each detector comprising a detector interferometer formed in a substrate, the detector interferometer comprising first and second detector arms, each detector arm comprising an optical waveguide having first and second ends, the detector arms having an optical path length difference LD(i) that differs from the optical path length difference LS(i) of the associated sensor by an amount no greater than the coherence length of the source associated with path length difference LS(i), the detector further comprising means for coupling sensor modulated radiation from the optical bus into the first ends of the detector arms and means for combining sensor modulated radiation from the second ends of the detector arms to produce the optical output signal corresponding to path length difference LS(i), whereby the intensity of each output signal varies in accordance with the variation of the sensed input parameter for the associated sensor.

3. The sensor system of claim 2, wherein all detector interferometers are formed on a common substrate.

4. The sensor system of claim 2, wherein each detector interferometer and its associated sensor interferometer are fabricated from the same mask.

5. The sensor system of claim 2 or 3, wherein each detector comprises a photodetector for converting the optical output signal into an electrical output signal, the photodetector being formed on the same substrate as the detector interferometer.

6. The sensor system of claim 2, wherein each detector is formed in an electro-optic substrate and comprises a photodetector for converting the optical output signal into a corresponding first electrical signal, a pair of electrodes positioned adjacent the first detector arm, means for producing an electrical output signal corresponding to the difference between the level of the first electrical signal and a predetermined reference level, and means for receiving the electrical output signal and producing a voltage on the electrodes such that the path length difference LD(i) remains at a quadrature point as the sensed input parameter for the associated sensor varies.

7. The sensor system of claim 1, wherein the detection subsystem comprises a detector interferometer coupled to receive the sensor modulated radiation from the optical bus, the detector interferometer having first and second detector arms, each detector arm having first and second ends, the detector interferometer further comprising means for coupling sensor modulated radiation from the optical bus into the first ends of the detector arms and means for combining sensor modulated radiation from the second ends of the detector arms to produce the optical output signal, the detector interferometer further comprising sweep means for varying the optical path length of the first detector arm such that the path length difference between the first and second detector arms sweeps through a range of path length differences such that each path length difference LS(i) differs from a path length difference in the range by an amount not greater than the coherence length of the source associated with path length difference LS(i).

8. The sensor system of claim 7, wherein the detector interferometer comprises a waveguide interferometer formed in an electro-optic substrate, wherein each detector arm comprises an optical waveguide, and wherein the sweep means comprises a pair of electrodes positioned adjacent the first detector arm and a sweep generator for applying a time varying voltage to the electrodes.

9. The sensor system of claim 7, wherein the interferometer comprises a Michelson interferometer having first and second mirrors respectively associated with the first and second detector arms, and wherein the sweep means comprises means for moving the first mirror to thereby vary the optical path length of the first arm.

10. The sensor system of claim 1, 2 or 7, wherein a common optical source is provided, and wherein the sensors ae serially coupled along the optical bus, such that radiation from the common optical source passes from the first to the second end of each arm of each sensor interferometer.

* * * * *